3,560,249
Patented Feb. 2, 1971

3,560,249
METHOD FOR PRODUCTION OF POLYTETRA-FLUOROETHYLENE MULTILAYER COATINGS ON HEAT-RESISTANT MATERIALS
Lev Vikentievich Chereshkevich, Ulitsa Vasenko 5/15, kv. 29; Dmitry Dmitrievich Chegodaev, Ulitsa Fedoseenko 19, kv. 39; and Nadezhda Elizarovna Yavzina, Ulitsa Tipanova 5, kv. 80, all of Leningrad, U.S.S.R.
No Drawing. Filed Sept. 23, 1968, Ser. No. 761,836
Int. Cl. B44d 1/14
U.S. Cl. 117—93.4       6 Claims

ABSTRACT OF THE DISCLOSURE

A method for the production of polytetrafluoroethylene multilayer coatings on heat-resistant materials which comprises depositing an aqueous dispersion of polytetrafluoroethylene onto said materials, followed by drying the deposited dispersion layer and baking the resultant layer of the polymer, wherein in the course of depositing the second and subsequent layers of the aqueous dispersion and/or immediately prior to dispersion deposition the surface of said materials is rubbed against a material capable of producing, on friction, a negative electrostatic charge on the surface of polytetrafluoroethylene.

---

This invention relates to methods of producing polytetrafluoroethylene multilayer coatings on heat-resistant materials, such as glass cloth, metal foil, wire gauze, etc.

The aforesaid materials having a polytetrafluoroethylene coating applied thereonto find application as heat-resistant, chemically stable and non-sticking materials. Polytetrafluoroethylene-coated glass cloth is primarily employed as a dielectric material for slot insulation in electric motors, for turn-to-turn and interlayer insulation in transformers, for the fabrication of multilayer plates to be used in radio engineering for printed circuits, etc.

It is known to produce polytetrafluoroethylene multilayer coating on heat-resistant materials, such as glass cloth, metal foil or wire gauze, by methods comprising depositing onto the aforesaid materials an aqueous dispersion of polytetrafluoroethylene, drying the deposited layer of the dispersion and subjecting the polymer to baking.

To produce polytetrafluoroethylene coatings, use is made of a 50–60% aqueous dispersion of polytetrafluoroethylene containing 9–12% of a surfactant (wetting agent) based on the weight of the polymer.

The coating of glass cloth and other materials with polytetrafluoroethylene is performed for the most part, in an impregnating machine, in which the material passes consecutively through a bath containing a polytetrafluoroethylene dispersion, a drying chamber in which there evaporate the water and the bulk of the surfactant, and finally through a baking oven in which at a temperature of ca. 370° C. the polytetrafluoroethylene undergoes baking and the last traces of the surfactant are expelled.

The known methods have a disadvantage in that wetting the surfaces coated with polytetrafluoroethylene becomes progressively more difficult as the number of polytetrafluoroethylene coatings applied onto the material being processes increases, so that in order to eliminate surface flaws, such as streaks or unwetted areas, it is mandatory to decrease the rate of material travel through the impregnating bath.

Heretofore no methods have been available to improve the wettability of polytetrafluoroethylene-coated glass cloth and to accelerate the rate of coated glass cloth travel through the bath containing the polytetrafluoroethylene dispersion, so that it is deemed impracticable and economically disadvantageous to carry out more than six successive cycles of coating the glass cloth with polytetrafluoroethylene, the maximum content of the polymer after six coating cycles being not greater than 60% based on the overall weight of the coated material.

It is an object of the present invention to eliminate the aforesaid disadvantages.

A further and more specific object of the invention is to provide a method of producing polytetrafluoroethylene multilayer coatings on heat-resistant materials which makes it possible to enhance wettability of the polytetrafluoroethylene deposited and baked on the surface of the material being processed and, therefore, to increase the rate of material travel through the impregnating machine and to obtain polytetrafluoroethylene-coated materials containing up to 90% and, if desired, more than 90% of the polymer based on the overall weight of the coated material.

These objects have been accomplished by a method of producing polytetrafluoroethylene multilayer coatings on heat-resistant materials, such as glass cloth, metal foil or wire gauze, which comprises depositing onto the aforesaid materials an aqueous dispersion of polytetrafluoroethylene in the presence of surfactants, preferably by passing the materials to be coated through an impregnating bath containing said dispersion, followed by drying the deposited dispersion layer and baking the polymer, wherein, according to the invention, the surface of said materials during the deposition of the second and subsequent aqueous dispersion layers and/or immediately prior to the deposition of said layers is rubbed with a material which produces a negative static charge on the surface of polytetrafluoroethylene.

It is expedient to rub the surface of said materials by drawing said materials between two fixed rolls coated with cloth or felt.

It is further expedient to use an aqueous suspension of polytetrafluoroethylene containing 4–12% of a surfactant based on the polymer weight to produce polytetrafluoroethylene coatings on said materials.

The negative charge generated on the polytetrafluoroethylene surface due to friction against cloth or felt provides for instantaneous wetting of the surface of the material being coated with an aqueous dispersion of polytetrafluoroethylene and for the resultant deposition of a uniform and flawless (without streaks and unwetted areas) layer of said dispersion on said surface.

Rubbing the surface of the materials being coated is instrumental in increasing the rate of wetting so significantly that there arises no necessity of decreasing the rate of material travel through the impregnating bath as the number of polytetrafluoroethylene coating grows. In this case, the rate of material travel through the impregnating machine is governed exclusively by the period of time required for drying a dispersion layer and baking a dry polymer layer. Insofar as the drying and baking time depends solely on the thickness of a dispersion layer, which thickness is constant under the impregnating conditions used, the rate of material travel through the impregnating machine will be constant irrespective of the number of previously deposited coatings. The present method renders it possible to apply not only 6 dispersion layers, but practically any desired number of layers, e.g. 12 or 18 so that no limitations are imposed on the coating thickness and it is feasible to obtaining polytetrafluoroethylene-coated materials containing any pre-set percentage of the polymer, viz., 75, 80, 85, 90% or more.

The phenomenon of wettability enhancement on rubbing has been discovered due to the observation that brush application of polytetrafluoroethylene dispersions on the polytetrafluoroethylene-coated material results in a significantly more rapid wetting of the material than is the case when the dispersion is applied onto the material by the dip or spray technique. It has been further found that rubbing the polytetrafluoroethylene surface more vigorously than it is attainable by means of a brush brings about a still greater wettability of the surface being coated.

The effect produced by rubbing the polytetrafluoroethylene surface can be explained as follows.

When glass cloth or wire gauze is coated with one polytetrafluoroethylene layer, the surface of said materials remains non-uniform since the polymer coat is too thin to cover all irregularities of the backing and more prominent sites of the polytetrafluoroethylene-coated surface of the material become the centres on which there accumulates negative static charge.

The presence of an electric charge provides for rapid wetting of protruding sites of the material as well as of the entire area of the material with the polytetrafluoroethylene dispersion. This phenomenon manifests itself when the material being processed is immersed in the polytetrafluoroethylene dispersion containing a surfactant, the negatively charged sites attract positively charged ends of the surfactant molecules and the resultant monomolecular layer of the surfactant on the polytetrafluoroethylene surface makes for rapid wetting of the surface of the material with the aqueous dispersion of polytetrafluoroethylene.

When the second layer of the polytetrafluoroethylene dispersion is applied onto glass cloth or wire gauze, surface tension forces will be responsible for the deposition of a thinner layer on the protruding areas of the material, whilst in depressions on the material surface the deposited layer will be accordingly thicker.

As a result of depositing subsequent layers of polytetrafluoroethylene, the surface of the materials being processed will become progressively smoother, i.e. the height of protruding areas on the surface will gradually diminish and, hence, the concentration of electric charge on said protrusions will be decreased accordingly, thereby inhibiting the formation of the monomolecular layer of the surfactant used and, consequently, slowing down the process of wetting the surface in question with the polytetrafluoroethylene dispersion.

Rubbing the surface of the materials with, e.g. felt or cloth produces a strong electric charge on the polytetrafluoroethylene surface, an important feature being that the static charge increases as the surface of the materials being processed becomes progressively smoother and a greater part of the surface contacts the rubbing device. The static charge thus produced is adequate to ensure instantaneous attraction of the positively charged ends of surfactant molecules and formation of a monomolecular layer, so that rubbing the surface of the materials being coated results in a situation where the rate of surface wetting, while the second polytetrafluoroethylene layer is being applied, is practically undistinguishable from that observed during the deposition of, say, the twelfth polymer layer.

When the material to be coated is metal foil, the application of the first polytetrafluoroethylene layer yields a perfectly smooth surface which does not lend itself to the deposition of the second layer without rubbing.

The present method for the production of polyfluoroethylene multilayer coating is accomplished in the following manner.

Onto heat-resistant materials, such as glass cloth, wire guaze or metal foil, is applied an aqueous dispersion of polytetrafluoroethylene containing surfactants.

The dispersion may be applied by the dip or spray technique but, in view of the fact that the materials to be coated consist for the most part of long strips, it is more expedient to apply the polytetrafluoroethylene dispersion thereon by means of impregnating machines. In the latter case, the roll of a heat-resistant material placed in the impregnating machine is unwound so that the material is drawn through a bath and the polytetrafluoroethylene dispersion is continuously deposited in the material surface. To rub the surface of the material being processed, it is good practice to resort to rubbing devices in the form of felt- or cloth-coated rollers or of rollers coated with some other material. The friction of the material being processed against the rollers produces an electric charge on the polytetrafluoroethylene surface. Use can be made of fixed rollers, but in more elaborate embodiments rollers are caused to rotate in the direction of or in opposition to the direction of material travel through the bath, but in either case the rate of roller rotation should exceed the rate of material travel. The friction devices may be disposed in the impregnating machine in various ways, as illustrated in examples, thereby making it possible to effect the rubbing of the material surface either during and/or immediately prior to the deposition of the aqueous dispersion of polytetrafluoroethylene.

The present method is conducive to the employment of the known aqueous dispersion of polytetrafluoroethylene containing 50–60 wt. percent of polymer and 9–12% of surfactant based on the weight of the polymer, or a dispersion containing a lower percentage of surfactant, viz. 4–9% based on the weight of the polymer.

The feasibility of employing an aqueous dispersion containing a lower percentage of surfactant offers a marked advantage, insofar as coating the aforesaid materials in the present of low surfactant concentrations results in obtaining polytetrafluoroethylene-coated materials noted for their lighter color and improved dielectric properties.

The material with the aqueous dispersion of polytetrafluoroethylene deposited thereonto comes to a drying chamber, in which there takes place the evaporation of water and surfactant, and then is fed into an oven for baking the polymer layer at a temperature of up to 370° C.

For a better understanding of the present invention, the following examples of producing polytetrafluoroethylene coatings on heat-resistant materials are given by way of illustration.

EXAMPLE 1

To coat glass cloth with polytetrafluoroethylene, use is made of an impregnating machine, in which provision is made for a rubbing device comprising two parallel, non-contacting rollers which may be either fixed or capable of rotating either in the direction of or in opposition to the direction of glass cloth travel through the machine, the speed of roller rotation being greater than the rate of glass cloth travel. The rollers are coated with felt or cloth and disposed in the impregnating bath so as to be completely immersed in the polytetrafluoroethylene dispersion. The glass cloth is drawn over the rollers in such a manner that initially one side of the cloth rubs against one fixed and rotating roller while the glass cloth is being drawn through the bath, and thereafter the other side of the glass cloth is caused to rub against the other fixed or rotating roller, whereupon the glass cloth travels over the third having no felt coat guide roller and leaves the impregnating bath. Next the glass cloth with the polytetrafluoroethylene dispersion deposited thereon comes to the drying chamber of the impregnating machine where it is subjected to drying at a temperature of 95–98° C. to evaporate the water and surfactant and thence is directed to the baking oven intended for fusing the polymer layer at a temperature of about 370° C.

The glass cloth 0.1 mm. thick acquires a thickness of 0.2 mm. after depositing 12 polytetrafluoroethylene layers thereon, the content of the polymer being 75% based on the overall weight of the coated material.

EXAMPLE 2

Glass cloth is processed in an impregnating machine in which provision is made for rubbing rollers described in Example 1, except for the fact that the rollers are disposed ahead of the impregnating bath, so that the glass cloth passes in the dry state over the rollers in the same way as it is disclosed in Example 1, whereupon the glass cloth is drawn through the impregnating bath, undergoes drying in the drying chamber and thence comes to the baking oven.

The glass cloth having 12 polytetrafluoroethylene layers deposited thereonto exhibits the characteristics described in Example 1.

EXAMPLE 3

To coat glass cloth with polytetrafluoroethylene, use is made of an impregnating machine, in which provision is made for rubbing rollers of the type described in Example 1, except for the fact that the rollers are disposed in a separate bath containing a 4–12% aqueous solution of the surfactant identical to that employed as a component of the polytetrafluoroethylene dispersion.

The glass cloth is processed by drawing it first through the bath containing the surfactant solution in order to completely wet the glass cloth surface, followed by treating the wetted glass cloth in the impregnating bath containing the polytetrafluoroethylene dispersion, drying the glass cloth with the dispersion applied thereonto in the drying chamber of the impregnating machine and, finally, treating the material in the baking oven in order to bake the polymer.

The glass cloth 0.1 mm. thick requires an overall thickness of 0.28–0.3 mm. after depositing thereonto 18 polytetrafluoroethylene coats, the content of the polymer being about 85% based on the overall weight of the coated material.

EXAMPLE 4

Aluminum foil is coated with polytetrafluoroethylene in an impregnating machine in which provision is made for rubbing rollers described in Example 1, except for the fact that the rollers are disposed ahead of an impregnating bath.

The aluminum foil is drawn over the rollers and thence comes to the impregnating bath containing the polytetrafluoroethylene dispersion, followed by treating the coated material in the drying chamber of the impregnating machine and next in the baking oven.

After applying and baking 10–12 layers of the polytetrafluoroethylene dispersion deposited on either side of the metal foil, the resultant material has a polytetrafluoroethylene coating 0.1 mm. thick on both sides.

The present method for the production of polytetrafluoroethylene multilayer coatings makes it possible to significantly increase the throughput of impregnating machines, insofar as it obviates the necessity of decreasing the rate of passing the material being processed through the impregnating bath containing the polytetrafluoroethylene dispersion as the number of the previously applied polytetrafluoroethylene coats increases.

Moreover, the present method provides the possibility of applying an unlimited number of polytetrafluoroethylene coats and, hence, of obtaining coated materials noted for an increased content of the polymer therein and, consequently, for improved dielectric characteristics.

Although the present invention has been described in accordance with a preferred embodiment thereof, it will be readily understood by those skilled in the art that various changes and modifications may be made without deviating from the spirit and scope of the invention.

These changes and modifications are to be considered as falling within the spirit and scope of the invention as defined in the appended claims.

We claim:

1. A method of producing polytetrafluoroethylene multilayer coatings on heat-resistant materials, e.g. on glass cloth, wire gauze or metal foil, which comprises depositing onto said heat-resistant materials an aqueous dispersion of polytetrafluoroethylene containing surfactants, and during depositing the second and subsequent layers of the aqueous dispersion of polytetrafluoroethylene and/or immediately prior to depositing said layers of the dispersion the surface of said materials being rubbed with a material that produces on the polytetrafluoroethylene surface an electrostatic charge, followed by drying the dispersion layer deposited on the material and baking the polymer.

2. A method according to claim 1, wherein the rubbing of the surface of said materials is effected by drawing said materials over two fixed cloth-coated rollers.

3. A method according to claim 1, wherein the rubbing of the surface of said materials is effected by drawing said materials over two fixed felt-coated rollers.

4. A method according to claim 1, wherein use is made of an aqueous dispersion of polytetrafluoroethylene containing 4–12% of surfactant based on the weight of the polymer to coat said materials.

5. A method according to claim 2, wherein use is made of an aqueous dispersion of polytetrafluoroethylene containing 4–12% of surfactant based on the weight of the polymer to coat said materials.

6. A method according to claim 3, wherein use is made of an aqueous dispersion of polytetrafluoroethylene containing 4–12% of surfactant based on the weight of the polymer to coat said materials.

References Cited

UNITED STATES PATENTS

| | | | |
|---|---|---|---|
| 2,476,145 | 7/1949 | Gwyn et al. | 117—17X |
| 2,707,703 | 5/1955 | Dorst | 117—132X |
| 2,952,559 | 9/1960 | Nadeau | 117—93.4X |

ALFRED L. LEAVITT, Primary Examiner

J. H. NEWSOME, Assistant Examiner

U.S. Cl. X.R.

117—126, 132; 204—181